United States Patent [19]

Dembicks

[11] Patent Number: 5,646,590
[45] Date of Patent: Jul. 8, 1997

[54] AUDIBLE TURN SIGNAL INDICATOR SYSTEM

[76] Inventor: Andrew E. Dembicks, 5308 Boca Marina Cir. North, Boca Raton, Fla. 33487

[21] Appl. No.: 402,612

[22] Filed: Mar. 13, 1995

[51] Int. Cl.⁶ .................................................. B60Q 1/34
[52] U.S. Cl. .................. 340/475; 340/474; 340/326; 340/457; 340/384.1
[58] Field of Search ........................ 340/475, 474, 340/457, 326, 327, 328, 329, 384.1

[56] References Cited

U.S. PATENT DOCUMENTS

| 2,258,747 | 10/1941 | Doane | 340/474 |
|---|---|---|---|
| 2,830,284 | 4/1958 | Keegin | 340/474 |
| 2,896,190 | 7/1959 | Gallaro et al. | 340/474 |
| 3,289,158 | 11/1966 | Olson | 340/474 |
| 3,343,123 | 9/1967 | Troesh | 340/474 |
| 3,515,226 | 6/1970 | Fernekes | 340/474 |
| 3,564,497 | 2/1971 | Gazzo | 340/474 |
| 3,806,868 | 4/1974 | Portman | 340/475 |
| 4,754,256 | 6/1988 | Fluhr et al. | 340/475 |
| 4,924,208 | 5/1990 | Coughlin | 340/474 |
| 4,975,623 | 12/1990 | Iketani | 340/475 |
| 4,980,669 | 12/1990 | Knowles | 340/474 |
| 5,012,221 | 4/1991 | Neuhaus et al. | 340/474 |
| 5,043,699 | 8/1991 | Hayden | 340/475 |
| 5,099,222 | 3/1992 | Campagna | 340/474 |
| 5,218,340 | 6/1993 | Shannon, Jr. et al. | 340/475 |
| 5,309,143 | 5/1994 | Brown et al. | 340/475 |

Primary Examiner—Donnie L. Crosland
Attorney, Agent, or Firm—Bell, Seltzer, Park & Gibson, P.A.

[57] ABSTRACT

An audible turn signal indicator system includes a turn signal selector for indicating an anticipated change in the direction of travel of a vehicle to a first direction and a second direction. The audible turn signal indicator system also includes audible directional indicator means for emitting first and second predetermined audible signals in response to an indication of an anticipated change in travel to the first and second directions, respectively. The first and second signals are audibly different in a predetermined manner such that the operator can determine the direction of the anticipated change in travel based upon the audible signals. In addition, the operator can determine which, if any, of the turn signals have been activated by monitoring the audibly different signals. The audible directional indicator means generally includes one or more speakers and an audible directional indicator controller for driving the speakers such that first and second audibly different signals are emitted thereby. For example, the first and second signals can be audibly different in frequency, volume or pattern, or the location of the source of the signals may be different.

18 Claims, 2 Drawing Sheets

AUDIBLE TURN SIGNAL INDICATOR SYSTEM

FIELD OF THE INVENTION

The present invention relates generally to turn signal indicator systems for vehicles and, more particularly, to audible turn signal indicator systems for use with various types of vehicles.

BACKGROUND OF THE INVENTION

A majority of vehicles include turn signals which provide a visual signal to nearby motorists and pedestrians of an anticipated change in the direction of travel of the vehicle. Typically, the turn signals include a pair of lights mounted on both the front and rear of the vehicle. In particular, left and right turn signals are generally mounted on both the front and rear of the vehicle.

The turn signals are generally activated by the driver of the vehicle by means of a turn signal selector such that the turn signals flash corresponding to the direction of the anticipated turn. Typically, the turn signal selector is a lever arm on the steering column which generally has three positions, namely, a left turn position, a right turn position and a neutral position. By placing the lever in the left turn position, the left turn signals on both the front and the rear of the vehicle are activated and will flash accordingly. Likewise, if the turn signal selector is placed in the right turn position, the right turn signals on both the front and rear of the vehicle are activated and will flash. In contrast, if the lever is placed in the neutral position, neither the right nor the left turn signals will be activated.

In order to provide the driver with an indication that the turn signals have been activated, many vehicles include a visual turn signal indicator. The visual turn signal indicator generally includes left and right visual displays which provide first and second predetermined visual signals, respectively, in response to movement of the turn signal selector to the left turn position and the right turn position, respectively. Typically, the left visual display is a left facing arrow which blinks during the time period which the left turn signals are activated. In a like fashion, the right visual display is generally a right facing arrow which blinks during the time period in which the right turn signals are activated.

In addition to visual turn signal indicators, a number of vehicles also include audible turn signal indicators. Conventional audible turn signal indicators generally include a sound generator and one or more speakers. Thus, upon actuation of either the left turn signal or the right turn signal, the sound generator of a conventional audible turn signal indicator drives the speakers to emit a predetermined sound. Typically, the predetermined sound is a series of rhythmic clicks which provide an audible indication to the driver that either the left turn signal or the right turn signal is activated. In addition, the predetermined sound emitted by conventional audible turn signal indicators is the same regardless of whether the left turn signal or the right turn signal has been activated.

Audible turn signal indicator systems have also been developed which notify the driver if the turn signals have not been extinguished or cancelled within a predetermined time period. Thus, the driver will be notified if the turn signal has not been cancelled shortly after completion of a turn or a lane change. For example, audible turn signal indicator systems have been developed with emit a tone, buzzer, bell or voice synthesized message which warns the driver if a turn signal has not been cancelled within a predetermined time period. See, for example, U.S. Pat. No. 5,309,143 which issued May 3, 1994 to Brown, et al. and is assigned to Donald Adkins; U.S. Pat. No. 5,218,340 which issued Jun. 8, 1993 to Shannon, Jr., et al.; U.S. Pat. No. 4,924,208 which issued May 8, 1990 to Coughlan; and U.S. Pat. No. 3,806,868 which issued Apr. 23, 1974 to Portman.

In addition, U.S. Pat. No. 5,099,222 which issued Mar. 24, 1992 to Campagna and is assigned to Fact Games, Ltd. discloses an audible turn signal indicator which produces an audible signal which progressively increases in volume as the turn signals remain activated for longer periods of time. Further, U.S. Pat. No. 2,258,747 which issued Oct. 14, 1941 to Doane discloses an audible turn signal indicator which provides a tactile signal to warn the vehicle's driver that the turn signal is activated. For example, the tactile signal can include a slight vibration of the steering column. Each of these audible turn signal indicators, however, provide the same signal regardless of whether the left turn signals or the right turn signals are activated.

SUMMARY OF THE INVENTION

In view of the foregoing background, it is therefore an object of the present invention to provide an improved turn signal indicator system, such as for use with a vehicle.

It is another object of the present invention to provide an improved audible turn signal indicator system, such as for use with a vehicle.

It is a further object of the present invention to provide an audible turn signal indicator system which allows the operator of a vehicle to determine the direction of the anticipated change in travel and the turn signals which have been activated based upon the audible signals.

These and other objects are provided, according to the present invention, by an audible turn signal indicator system which produces first and second audibly different signals such that an driver of a vehicle can determine the direction of the anticipated change in travel based upon the audible signals. The audible turn signal indicator system includes turn signal selection means, responsive to actuation by the driver, for indicating an anticipated change in the direction of travel of the vehicle. The turn signal selection means includes means for indicating an anticipated change in travel to first and second directions. The audible turn signal indicator system also includes audible directional indicator means, responsive to the turn signal selection means, for emitting first and second audibly different signals in response to an indication of an anticipated change in travel to the first and second directions, respectively. The audible directional indicator means can include signal generation means, such as a signal generator, for generating the first and second audibly different signals.

In one embodiment, the turn signal selection means includes first and second turn signal selectors for indicating an anticipated change to the first and second directions, respectively, by the vehicle. In one more specific embodiment, the turn signal selection means includes left and right turn signal selectors for indicating anticipated left and right turns, respectively, by the vehicle.

The audible directional indicator means of one embodiment of the audible turn signal indicator system of the present invention includes first and second speakers mounted in first and second predetermined positions, respectively, within the passenger compartment of the vehicle. For example, the speakers can include left and right speakers mounted on the left and right sides of the passenger compartment, respectively. According to this embodiment, the audible turn signal indicator means also includes an audible directional indicator controller for driving the first speaker in response to actuation of the first turn signal selector such that the first speaker emits the first predetermined signal. The audible directional indicator controller also drives the second speaker in response to actuation of the second turn signal selector such that the second speaker emits the second predetermined signal.

For example, the audible directional indicator controller can drive the left speaker in response to actuation of the left turn signal selector such that only the left speaker emits a predetermined signal. Likewise, the audible directional indicator controller of the example can drive the right speaker in response to actuation of the right turn signal selector such that only the right speaker emits the same predetermined signal. Thus, even though the predetermined signals emitted are the same in pattern, frequency and volume, the operator can determine the direction of the anticipated change in travel based upon the location of the speaker which emits the predetermined signals.

In another embodiment, the audible turn signal indicator system includes at least one speaker mounted within the passenger compartment of the vehicle and an associated audible directional indicator controller. The audible directional indicator controller drives the speaker in response to actuation of the first and second turn signal selectors such that the speaker emits first and second audible signals, respectively, at first and second predetermined frequencies, respectively. The first and second predetermined frequencies are different such that the driver can determine the direction of the anticipated change in travel based upon the frequency of the signal emitted by the speaker.

In still another embodiment, the audible directional indicator controller drives the speaker in response to actuation of the first and second turn signal selectors such that the speaker emits first and second audible signals, respectively, at first and second predetermined volumes, respectively. The first and second predetermined volumes are different such that the driver can determine the direction of the anticipated change in travel based upon the volume of the signals emitted by the speaker.

In yet another embodiment, the audible directional indicator controller drives the speaker in response to actuation of the first and second turn signal selectors such that the speaker emits first and second audible signals, respectively, having first and second predetermined patterns, respectively. For example, the first and second predetermined patterns can be first and second voice synthesized message. In this exemplary embodiment, the audible directional indicator controller includes first means for generating the first audible signals which have a first predetermined voice synthesized message, and second means for generating second audible signals which have a second predetermined voice synthesized message. The first and second predetermined signal patterns, such as the first and second voice synthesized messages, are different such that the operator can determine the direction of the anticipated change in travel based upon the signal pattern, or voice synthesized message, emitted by the speaker.

The audible turn signal indicator system of the present invention can also include volume adjustment means, such as a volume adjuster, for controllably adjusting the relative volume of the emitted signals in response to actuation by the driver. In addition, the audible turn signal indicator system can include visual directional indicator means, responsive to the turn signal selection means, for displaying first and second predetermined visual signals in response to an indication of an anticipated change in travel to the first and second directions, respectively.

Therefore, the audible turn signal indicator system of the present invention provides first and second signals in response to an indication of an anticipated change in travel of the vehicle to first and second directions, respectively. The first and second signals are audibly different, such as in frequency, volume, pattern or location of the source, such that the driver can determine the direction of the anticipated change in travel based upon the audible signals. Therefore, the driver of the vehicle can continue to look through the windshield of the vehicle at the roadway while audibly determining which, if any, turn signals are active. Accordingly, the operational safety of a vehicle incorporating an audible turn signal indicator system of the present invention is enhanced in comparison to systems in which the operator must glance away from the roadway in order to determine which, if any, turn signals were activated.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
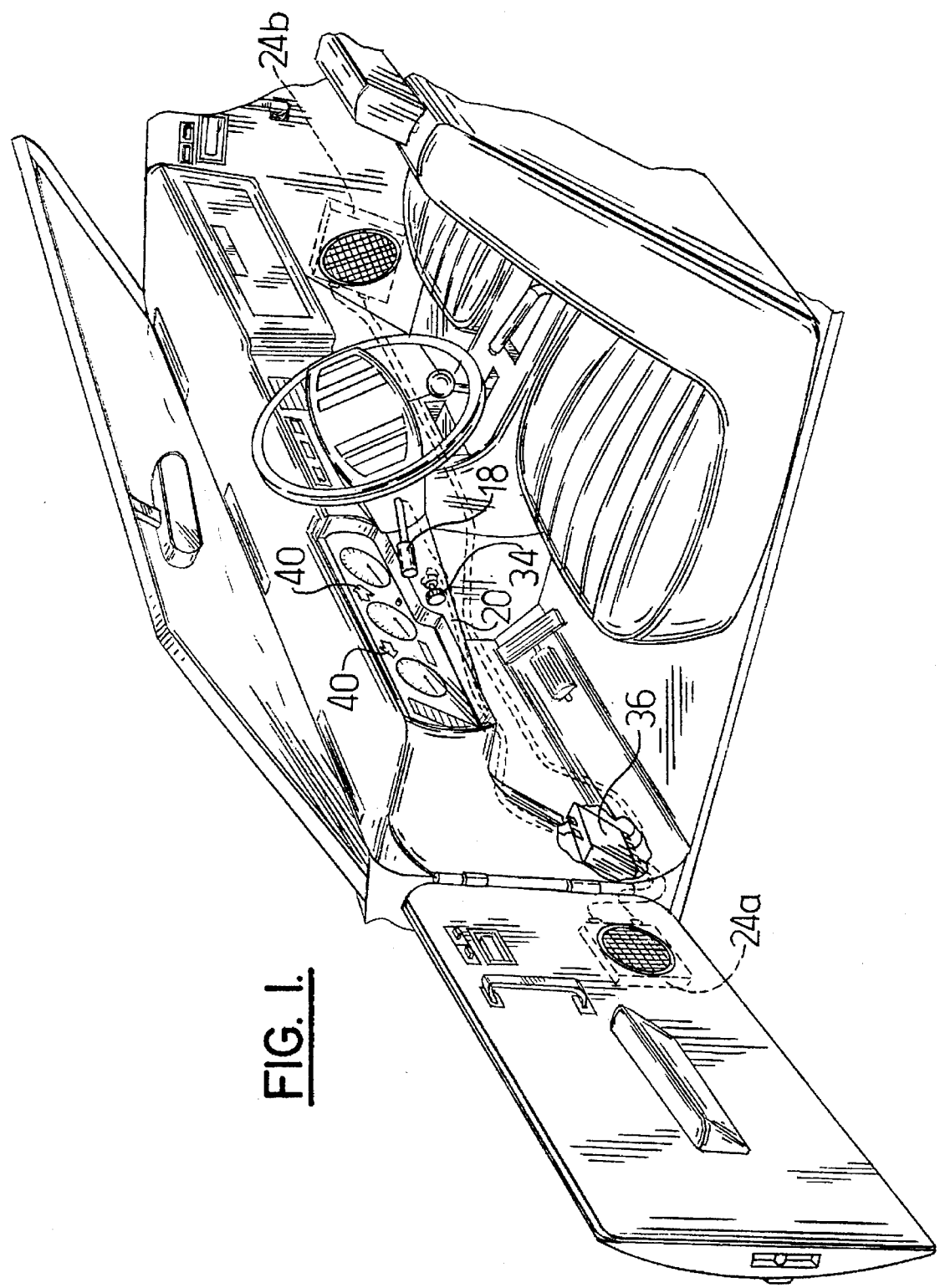
FIG. 1 is a perspective fragmentary view of a portion of the passenger compartment of a vehicle incorporating an audible turn signal indicator system of the present invention.

Referring now to FIG. 1, a portion of the passenger compartment of a vehicle, such as an automobile, which includes an audible turn signal indicator system 10 according to the present invention is shown in fragmentary perspective view. The audible turn signal indicator system of the present invention includes turn signal selection means 12, such as a turn signal selector, responsive to actuation by an driver of a vehicle. The turn signal selector indicates an anticipated change in the direction of travel of the vehicle.

In particular, the turn signal selection means 12 includes means for indicating an anticipated change in travel to a first direction and to a second direction. More particularly, the turn signal selector can include a first turn signal selector 14 for indicating an anticipated change to the first direction by the vehicle, and a second turn signal selector 16 for indicating an anticipated change to the second direction by the vehicle. For example, the turn signal selector can include a left turn signal selector for indicating an anticipated left turn by the vehicle, and a right turn signal selector for indicating an anticipated right turn by the vehicle.

As illustrated in FIG. 1, the turn signal selector 12 can include a lever or arm 18 which is mounted to the steering column 20. The lever generally has three positions, namely, a neutral position, a first position and a second position. Typically, the first position indicates an anticipated change in travel to the first direction, such as an anticipated left turn by the vehicle. Likewise, the second position generally indicates an anticipated change in travel to the second direction, such as an anticipated right turn by the vehicle.

For example, the lever 18 can be moved downwardly by the driver from the neutral or central position to the first position to indicate an anticipated change of travel to the first direction. Similarly, the lever can be moved upwardly from the neutral or central position to the second position to indicate an anticipated change in direction of travel to the second direction. While the turn signal selection means of the audible turn signal indicator system 10 of the present invention is illustrated as including a lever or arm mounted on the steering column 20, other means for indicating an anticipated change in the direction of travel of the vehicle can be employed without departing from the spirit and scope of the present invention.

Although not illustrated, the vehicle generally includes turn signals, such as lights or bulbs, mounted on the front and rear of the vehicle. Typically, both a left and a right turn signal are mounted on the left and right sides, respectively, of both the front and rear of a vehicle. Accordingly, upon actuating the left turn signal selector, such as by moving the lever downwardly to the first position, the left turn signals on both the front and rear of the vehicle will flash. Likewise, by actuating the right turn signal selector, such as by moving the lever upwardly to the second position, the right turn signals on both the front and rear of the vehicle will flash.

Figure 2:
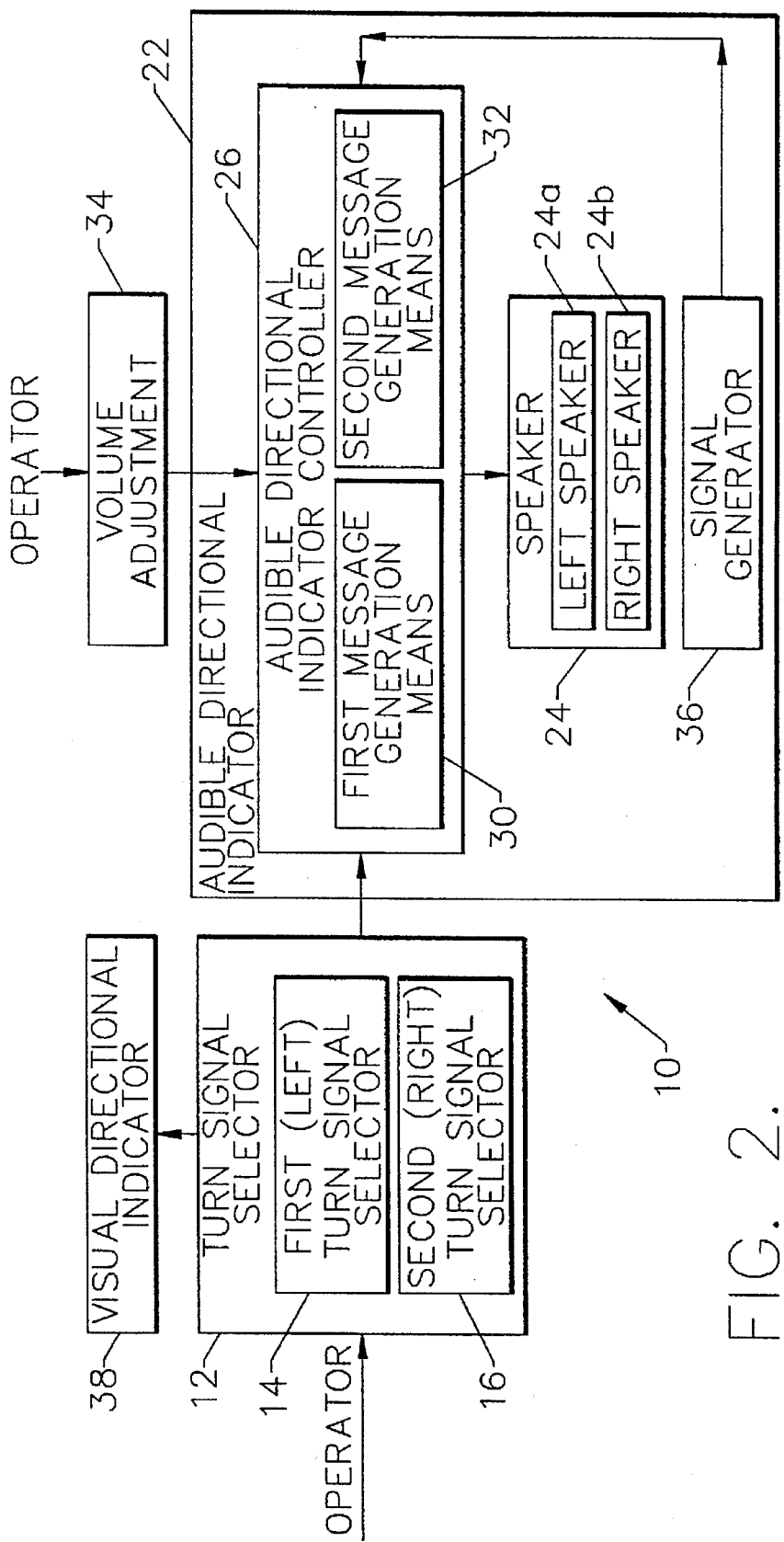
FIG. 2 is a block diagram of an audible turn signal indicator system of the present invention.

As best illustrated in block diagram form in FIG. 2, the audible turn signal indicator system 10 also includes an audible directional indicator means 22, responsive to the turn signal selection means 12, for emitting first and second predetermined audible signals in response to an indication of an anticipated change in travel to the first and second directions, respectively. According to the present invention, the first and second signals are audibly different. Therefore, the driver can determine the direction of the anticipated change in travel based solely upon the audible signals.

Thus, the operator need not take their eyes from the roadway, but can continue to view the roadway through the windshield while simultaneously determining which, if either, turn signal is activated by the audible signals emitted by the audible turn signal indicator system 10 of the present invention. Accordingly, the safety of operation of the vehicle is increased since the operator can continue to view the roadway during operation of the vehicle.

The audible directional indicator means 22 can include at least one speaker 24, such as a sound emitting transducer or other sound emitting device. In one embodiment, the audible directional indicator means includes first and second speakers mounted in first and second predetermined positions, respectively, within the passenger compartment. As illustrated in FIG. 1, the first and second speakers can include left and right speakers mounted on the left and right sides, respectively, of the passenger compartment.

According to this embodiment, the audible directional indicator means 22 also includes an audible directional indicator controller 26 for driving the first speaker 24a in response to actuation of the first turn signal selector 14 by the operator such that the first speaker emits the first predetermined signal. The audible directional indicator controller also drives the second speaker 24b in response to actuation of the second turn signal selector 16 by the driver such that the second speaker emits the second predetermined signal. Based upon the location of the speaker 24 which emits predetermined signals, the driver can determine the direction of the anticipated change in travel and, consequently, the turn signals which are activated.

For example, the audible directional indicator controller 26 preferably drives the left speaker 24a in response to actuation of the left turn signal selector 14 by the driver such that the left speaker emits the first predetermined signal. Likewise, the audible directional indicator controller preferably drives the right speaker 24b in response to actuation of the right turn signal selector 16 by the driver such that the right speaker emits the second predetermined signal. Thus, if the predetermined signal is emitted by the left speaker, the driver can determine that the left turn signals are activated. Similarly, if the right speaker emits the predetermined signal, the driver can determine that the right turn signals are activated. Accordingly, even if the first and second predetermined signals are identical in pattern, frequency and volume, the operator can determine which, if any, turn signals are activated based upon the location or source from which the signals are emitted, i.e. the first or second speakers.

In another embodiment, the audible directional indicator controller 26 drives the speakers 24 in response to actuation of the first turn signal selector 14 such that the speakers emit the first audible signal at a first predetermined frequency or within a first predetermined range of frequencies. According to this embodiment, the audible directional indicator controller also drives the speakers in response to actuation of the second turn signal selector 16 such that the speakers emit a second audible signal at a second predetermined frequency or a second predetermined range of frequencies.

The first and second predetermined frequencies or the first and second predetermined ranges of frequencies are different. Therefore, even though each speaker 24 can be simultaneously driven by the audible directional indicator controller 26, the driver can determine the direction of the anticipated change in travel based upon the frequency of the signals emitted by the speaker. For example, if the driver detects the emission of a signal having the first predetermined frequency, the driver can determine that the first turn signals are activated. Alternatively, if the driver detects the emission of a signal having the second predetermined frequency, the operator can determine that the second turn signals are activated.

In still another embodiment, the audible directional indicator controller 26 drives the speakers 24 in response to actuation of the first turn signal selector 14 such that the speakers emit a first audible signal at a first predetermined volume. The audible directional indicator controller of this embodiment also drives the speakers in response to actuation of the second turn signal selector 16 such that the speakers emit a second audible signal at a second predetermined volume. By selecting the first and second predetermined volumes to be different, the driver can determine the direction of the anticipated change in travel based upon the volume of the signals emitted by the speakers, even though all speakers may be simultaneously driven by the audible direction indicator controller.

For example, the first predetermined volume can be relatively low, while the second predetermined volume can be relatively high. Thus, if the operator detects the emission of a signal having a relatively low volume, the operator can determine that the first turn signals are activated. Alternatively, if the operator detects the emission of a signal having a relatively high volume, the operator can determine that the second turn signals are activated.

In yet another embodiment, the audible directional indicator controller 26 drives the speakers 24 in response to actuation of the first turn signal selector 14 such that the speakers emit first audible signals having a first predetermined pattern. The audible directional indicator controller of this embodiment also drives the speakers in response to actuation of the second turn signal selector 16 such that the speakers emit second audible signals having a second predetermined pattern. By selecting the first and second predetermined patterns to be different, the operator can determine the direction of the anticipated change in travel based upon the pattern of the signals emitted by the speakers, even though all speakers can be simultaneously driven by the audible directional indicator controller of this embodiment.

The first and second predetermined patterns can include first and second predetermined voice synthesized messages. In this embodiment, the audible directional indicator controller 26 of this embodiment can include first means 30 for generating first audible signals which have a first predetermined voice synthesized message. The audible directional indicator controller of this embodiment can also include second means 32 for generating second audible signals which have a second predetermined voice synthesized message. Preferably, the first and second voice synthesized messages are different such that the operator can determine the direction of the anticipated change in travel based upon the voice synthesized message emitted by the speakers 24. For example, the first predetermined voice synthesized message can be "the left turn signal is activated". Likewise, the second predetermined voice synthesized message can be "the right turn signal is activated". However, other voice synthesized messages can be employed without departing from the spirit and scope of the present invention.

Several specific examples of the generation of audibly different signals are provided herein, that is, signals having different volumes, frequencies, patterns and sources, for the purposes of illustration. However, it should be apparent that the audible directional indicator means 22 can emit first and second predetermined audible signals which are audibly different in a variety of manners without departing from the spirit and scope of the present invention.

As illustrated in FIGS. 1 and 2, the audible turn signal indicator system 10 of the present invention can also include volume adjustment means 34, responsive to actuation by the operator, for controllably adjusting the relative volume of the first and second signals generated by the audible directional indicator means 22. For example, the volume adjustment means can include a volume adjuster, such as a rotary knob as illustrated in FIG. 1, which the operator can position to selectively control the relative volume of the first and second signals.

In addition, the audible directional indicator means 22 preferably includes signal generation means 36, such as a signal generator as known to those skilled in the art, for generating the first and second predetermined audible signals. The signal generator preferably drives a plurality of speakers, sound transducers or other sound emitting devices as also known to those skilled in the art.

In addition to the audible indication of the direction of the anticipated change in travel, the audible turn signal indicator system 10 of the present invention can also include visual directional indicator means 38. The visual directional indicator means is responsive to the turn signal selection means 12 and displays first and second predetermined visual signals in response to an indication of an anticipated change in travel to the first and second directions, respectively.

In one embodiment, the visual directional indicator means can include first and second visual displays 40, as illustrated in FIG. 1, which are located on first and second sides of the dashboard, respectively. For example, the first and second visual displays can be in the shape of a left facing arrow and a right facing arrow, respectively, to indicate an anticipated change in travel to the left and to the right, respectively. Thus, upon movement of the turn signal selector 12 to the first position, the first visual display is preferably illuminated, such as by a flashing signal, and a first predetermined audible signal is simultaneously emitted by the audible turn signal indicator system 10 of the present invention. Likewise, upon movement of the turn signal selector to the second position, the second visual display is preferably illuminated, such as by a flashing signal, and a second predetermined audible signal is simultaneously emitted by the audible turn signal indicator system.

Therefore, the audible turn signal indicator system of the present invention provides first and second audible signals in response to an indication of an anticipated change in travel of the vehicle to first and second directions, respectively. The first and second signals are audibly different, such as in frequency, volume, pattern or location of the source, such that the operator can determine the direction of the anticipated change in travel based upon the audible signals. Therefore, the operator of the vehicle can continue to view the roadway while simultaneously audibly determining which, if any, of the turn signals are active. Accordingly, the operational safety of a vehicle incorporating an audible turn signal indicator system of the present invention is enhanced.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. An audible turn signal indicator system comprising:

turn signal selection means, responsive to actuation by an operator of a vehicle, for indicating an anticipated change in the direction of travel of the vehicle, said turn signal selection means including means for indicating an anticipated change in travel to a first direction and a second direction; and audible directional indicator means, responsive to said turn signal selection means, for emitting first and second predetermined audible signals in response to an indication of an anticipated change in travel to the first and second directions, respectively, wherein the first and second signals are audibly different such that the operator can thereby determine the direction of the anticipated change in travel based upon the audible signals.

2. An audible turn signal indicator system according to claim 1 wherein said turn signal selection means comprises:

a first turn signal selector for indicating an anticipated change to a first direction by the vehicle; and a second turn signal selector for indicating an anticipated change to a second direction by the vehicle.

3. An audible turn signal indicator system according to claim 2 wherein said audible directional indicator means comprises:

first and second speakers mounted in first and second predetermined positions, respectively, within a passenger compartment of the vehicle; and an audible directional indicator controller for driving said first speaker in response to actuation of said first turn signal selector by the operator such that said first speaker emits the first predetermined signal, and for driving said second speaker in response to actuation of said second turn signal selector by the operator such that said second speaker emits the second predetermined signal such that the operator can thereby determine the direction of the anticipated change in travel based upon the location of the speaker which emits the predetermined signals.

4. An audible turn signal indicator system according to claim 2 wherein said audible directional indicator means comprises:

at least one speaker mounted within a passenger compartment of the vehicle; and an audible directional indicator controller for driving said at least one speaker in response to actuation of said first turn signal selector such that said at least one speaker emits the first audible signals at a first predetermined frequency, and for driving said at least one speaker in response to actuation of said second turn signal selector such that said at least one speaker emits the second audible signals at a second predetermined frequency, wherein said first and second predetermined frequencies are different such that the operator can thereby determine the direction of the anticipated change in travel based upon the frequency of the signals emitted by said at least one speaker.

5. An audible turn signal indicator system according to claim 2 wherein said audible directional indicator means comprises:

at least one speaker mounted within a passenger compartment of the vehicle; and an audible directional indicator controller for driving said at least one speaker in response to actuation of said first turn signal selector such that said at least one speaker emits the first audible signals at a first predetermined volume, and for driving said at least one speaker in response to actuation of said second turn signal selector such that said at least one speaker emits the second audible signals at a second predetermined volume, wherein said first and second predetermined volumes are different such that the operator can thereby determine the direction of the anticipated change in travel based upon the volume of the signals emitted by said at least one speaker.

6. An audible turn signal indicator system according to claim 5 further comprising volume adjustment means, responsive to actuation by the operator, for controllably adjusting the relative volume of the first and second signals.

7. An audible turn signal indicator system according to claim 2 wherein said audible directional indicator means comprises:

at least one speaker mounted within a passenger compartment of the vehicle; and an audible directional indicator controller for driving said at least one speaker in response to actuation of said first turn signal selector such that said at least one speaker emits first audible signals having a first predetermined pattern, and for driving said at least one speaker in response to actuation of said second turn signal selector such that said at least one speaker emits second audible signals having a second predetermined pattern, wherein said first and second predetermined patterns are different such that the operator can thereby determine the direction of the anticipated change in travel based upon the volume of the signals emitted by said at least one speaker.

8. An audible turn signal indicator system according to claim 7 wherein said audible directional indicator controller comprises:

first means for generating the first audible signals which have a first predetermined voice synthesized message; and second means for generating the second audible signals which have a second predetermined voice synthesized message, wherein the first and second voice synthesized messages are different.

9. An audible turn signal indicator system according to claim 1 further comprising visual directional indicator means, responsive to said turn signal selection means, for displaying first and second predetermined visual signals in response to an indication of an anticipated change in travel to the first and second directions, respectively.

10. An audible turn signal indicator system according to claim 1 wherein said audible directional indicator means comprises signal generation means for generating the first and second predetermined audible signals.

11. An audible turn signal indicator system comprising:

a turn signal selector, responsive to actuation by an operator of a vehicle, for indicating an anticipated change in the direction of travel of the vehicle, said turn signal selector comprising a left turn signal selector for indicating an anticipated left turn by the vehicle, said turn signal selector also comprising a right turn signal selector for indicating an anticipated right turn by the vehicle;

left and right speakers mounted on the left and right sides of a passenger compartment of the vehicle, respectively; and an audible directional indicator controller, responsive to said turn signal selector, for driving said left speaker in response to actuation of said left turn signal selector by the operator such that only said left speaker emits a predetermined signal, and for driving said right speaker in response to actuation of said right turn signal selector by the operator such that only said right speaker emits a predetermined signal such that the operator can thereby determine the direction of the anticipated change in travel based upon the location of the speaker which emits the predetermined signals.

12. An audible turn signal indicator system according to claim 11 further comprising a volume adjustment, responsive to actuation by the operator, for controllably adjusting the relative volume of the predetermined signals.

13. An audible turn signal indicator system according to claim 11 further comprising a visual directional indicator, responsive to said turn signal selector, for displaying first and second predetermined visual signals in response to an indication of an anticipated left and right turn by the vehicle, respectively.

14. An audible turn signal indicator system according to claim 11 wherein said audible directional indicator controller comprises a signal generator for generating the first and second predetermined audible signals.

15. An audible turn signal indicator system comprising:

a turn signal selector, responsive to actuation by an operator of a vehicle, for indicating an anticipated change in the direction of travel of the vehicle, said turn signal selector comprising a first turn signal selector for indicating an anticipated change to the first direction by the vehicle, said turn signal selector also comprising a second turn signal selector for indicating an anticipated change to the second direction by the vehicle;

at least one speaker mounted within a passenger compartment of the vehicle; and an audible directional indicator controller, responsive to said turn signal selector, for driving said at least one speaker in response to actuation of said first turn signal selector such that said at least one speaker emits audible signals at a first predetermined frequency, and for driving said at least one speaker in response to actuation of said second turn signal selector such that said at least one speaker emits audible signals at a second predetermined frequency, wherein said first and second predetermined frequencies are different such that the operator can thereby determine the direction of the anticipated change in travel based upon the frequency of the signals emitted by said at least one speaker.

16. An audible turn signal indicator system according to claim 15 further comprising a volume adjustment, responsive to actuation by the operator, for controllably adjusting the relative volume of the audible signals.

17. An audible turn signal indicator system according to claim 15 further comprising a visual directional indicator, responsive to said turn signal selector, for displaying first and second predetermined visual signals in response to an indication of an anticipated change in travel to the first and second directions, respectively.

18. An audible turn signal indicator system according to claim 15 wherein said audible directional indicator controller comprises a signal generator for generating the audible signals.

* * * * *